United States Patent
Sailer et al.

(10) Patent No.: US 7,397,982 B2
(45) Date of Patent: Jul. 8, 2008

(54) REFLECTOR ARRANGEMENT

(75) Inventors: Michael Sailer, Wolfskofen (DE); Mario Wanninger, Harting (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 11/631,716

(22) PCT Filed: Jun. 23, 2005

(86) PCT No.: PCT/DE2005/001119

§ 371 (c)(1), (2), (4) Date: May 30, 2007

(87) PCT Pub. No.: WO2006/005289

PCT Pub. Date: Jan. 19, 2006

(65) Prior Publication Data

US 2007/0230869 A1  Oct. 4, 2007

(30) Foreign Application Priority Data

Jul. 7, 2004 (DE) .................. 10 2004 032 948
Apr. 12, 2005 (DE) .................. 10 2005 016 849

(51) Int. Cl.
*G02B 6/26* (2006.01)

(52) U.S. Cl. ........................ 385/27; 385/36; 385/147

(58) Field of Classification Search .............. 385/31, 385/15, 39, 53, 36, 70, 76, 77, 78, 88, 92, 385/14, 147, 27

See application file for complete search history.

(56) References Cited

U.S. PATENT DOCUMENTS

| | | | | |
|---|---|---|---|---|
| 3,935,560 A | * | 1/1976 | Dorn ........................ | 362/378 |
| 5,184,888 A | | 2/1993 | Sakuma et al. ............. | 362/136 |
| 5,674,181 A | * | 10/1997 | Iida ........................... | 600/127 |
| 6,169,839 B1 | | 1/2001 | Johanson .................. | 385/146 |
| 6,259,082 B1 | | 7/2001 | Fujimoto et al. ........ | 250/208.1 |
| 6,554,494 B2 | * | 4/2003 | Bruland et al. ............ | 385/92 |
| 7,220,061 B2 | * | 5/2007 | De Marchi ................ | 385/76 |
| 2001/0017965 A1 | * | 8/2001 | Bruland et al. ............ | 385/92 |
| 2005/0073628 A1 | | 4/2005 | Morsch et al. ............ | 349/67 |
| 2005/0175291 A1 | * | 8/2005 | De Marchi ................ | 385/86 |
| 2007/0230869 A1 | * | 10/2007 | Sailer et al. ............... | 385/27 |

FOREIGN PATENT DOCUMENTS

| | | | | |
|---|---|---|---|---|
| DE | 19706043 | | 6/1998 | ........... 385/147 X |
| DE | 10242589 | | 1/2002 | ........... 385/147 X |
| JP | 2000-011729 | | 1/2000 | ........... 385/147 X |

OTHER PUBLICATIONS

Authorized officer: Bourhis, J-F., *International Search Report*, PCT/DE2005/001119, Sep. 15, 2005.

* cited by examiner

*Primary Examiner*—Brian M Healy
(74) *Attorney, Agent, or Firm*—Fish & Richardson P.C.

(57) ABSTRACT

The invention relates to a reflector arrangement comprising a reflector and a light guide. It is characterized in that the use of film hinges permits simpler and lower-cost assembly than has heretofore been possible with comparable reflector arrangements.

19 Claims, 5 Drawing Sheets

REFLECTOR ARRANGEMENT

CROSS-REFERENCE TO RELATED APPLICATIONS

This application is the National Stage of International Application No. PCT/DE2005/001119, filed on Jun. 23, 2005, which claims the priority to German Patent Applications Ser. No. 102004032948.6, filed on Jul. 7, 2004, and Ser. No. 102005016849.3, filed on Apr. 12, 2005. The contents of all of the above-identified applications are hereby incorporated by reference in their entireties.

FIELD OF THE INVENTION

The invention relates to a reflector arrangement comprising a reflector and an optical waveguide.

BACKGROUND OF THE INVENTION

Arrangements of this kind are used to guide light from a light source to a desired location with as little loss as possible and there to couple it out of the light guide in accordance with the application, particularly through a window. Depending on the intended use, the widest variety of light sources are combined with such reflector arrangements. Light-emitting or laser diodes, inter alia, can be employed as light sources.

Reflector arrangements find application as general illuminants or as efficient background lighting for liquid crystal displays (LCDs). In such cases, the light is usually guided from the light source to a window, from which it is extracted as uniformly as possible. The light guide often has a roughened surface at the site of the exit window, to homogenize the exiting light. The light guide is usually made from transparent materials, such as for example polymethylmethacrylate (PMMA) or epoxy resin. To minimize losses, the reflector surrounds the light guide in subregions. To be able to surround the light guide, the reflector is formed of plural elements that must be assembled around the light guide during the assembly process.

U.S. Pat. No. 6,259,082 B1 discloses an arrangement composed of a reflector and a light guide in which the reflector is constructed of plural elements that surround the light guide. A variety of equipment and tools is needed to fabricate the individual elements. These parts must then be fitted together during the assembly of such an arrangement. Each of the elements is therefore associated with logistical expenditure. More elements generally make for an increased number of work steps, which can additionally create sources of error in the production process. Large numbers of elements are also, on the whole, associated with higher costs.

The object of the invention is to disclose a reflector arrangement of the initially cited kind, which permits an improvement in a cost-effective manner.

The invention achieves this object by means of the features of claim 1. Configurations of the invention are characterized in the dependent claims.

In the present invention, at least one reflector shaped body is fixedly connected to at least one other shaped body of the reflector via a bendable connector, a so-called film hinge. This reduces the expenditure associated with assembly. Assembly expenditure is limited to the following steps: placing the light guide in the reflector; folding the reflector together; securing the movable parts.

An advantageous embodiment of the invention results if the reflector is implemented in one piece with at least one film hinge, disposed between shaped bodies of the reflector and thereto-assigned fastening means. This advantageously reduces the number of individual parts needed overall. The logistical expenditure involved in shipping the parts and keeping them in stock and the assembly expenditure are reduced, since fewer individual parts are needed to make a reflector arrangement.

A further advantageous embodiment of the invention results if the reflector, together with the film hinge(s), is produced in one piece by injection molding or another molding process. Only one mold with one cavity is therefore needed. In addition, limitation to a single injection point on the mold is thereby feasible. This has economic advantages with regard to production.

In a further advantageous embodiment of the invention, a film hinge is implemented as at least segmentally continuous along the extension of the axis of the hinge. The axis of the hinge is the axis about which shaped bodies of a reflector rotate or fold. It usually lies on a common edge of different shaped bodies.

A further advantageous embodiment of the invention results if a film hinge is implemented not as continuous, but as locally interrupted.

In a further advantageous embodiment of the invention, the reflector arrangement contains an angled light guide.

In a further advantageous embodiment of the invention, the assembled reflector surrounds the light guide.

A further advantageous embodiment of the invention provides that shaped bodies of the reflector that are connected by a film hinge can be secured to one another by means of fasteners.

A further advantageous embodiment of the invention provides that shaped bodies of the reflector that are connected by a film hinge can be secured to the light guide by means of fasteners.

A further advantageous embodiment of the invention provides that shaped bodies of the reflector that are connected by a film hinge can be secured both to one another and to the light guide by means of fasteners.

In a further advantageous embodiment of the invention, a snap mechanism is provided as fastening means for the reflector arrangement. Assembly thus is reduced to inserting the light guide, folding the molded parts together and engaging the snap. The error rate in assembly is also reduced in this way.

In a further advantageous embodiment of the invention, a latch is provided as fastening means for the reflector arrangement. Assembly thus is reduced to inserting the light guide, folding the molded parts together and engaging the latch. The error rate in assembly is also reduced in this way. Latching, in contrast to snapping, permits fastening in a plurality of discrete positions.

In a further advantageous embodiment of the invention, contact surfaces for gluing are provided as fastening means for the reflector arrangement. Assembly thus is reduced to inserting the light guide, folding the molded parts together and gluing the contact surfaces. The error rate in assembly is also reduced in this way.

In a further advantageous embodiment of the invention, contact surfaces for welding are provided as fastening means for the reflector arrangement. Assembly thus is reduced to inserting the light guide, folding the molded parts together and welding the contact surfaces. The error rate in assembly is also reduced in this way.

In a further advantageous embodiment of the invention, contact surfaces for swaging are provided as fastening means for the reflector arrangement. Assembly thus is reduced to inserting the light guide, folding the molded parts together and swaging the contact surfaces. The error rate in assembly is also reduced in this way.

A further advantageous embodiment of the invention provides that the reflector performs a holding function for the light guide. A holding function of the reflector with respect to the light guide can be achieved merely by fitting the reflector exactly to the light guide and having it partially surround the latter. Direct holding modalities are also possible, however. Guide rails, latch lugs or snap lugs may be cited as examples.

In embodiments where a fastener is disposed between the reflector and the light guide, or the reflector at least partially surrounds the light guide in subregions, the reflector can also additionally perform a securing function for the light guide.

A further advantageous embodiment of the invention provides that the reflector comprises one or more light exit windows.

A further advantageous embodiment of the invention provides that the reflector comprises one or more light entrance windows.

The invention will be described below with reference to exemplary embodiments which are illustrated in the figures of the drawing. Elements of the same kind have been provided with the same respective reference numerals.

DETAILED DESCRIPTION OF THE PREFERRED EMBODIMENTS

Figure 1A:
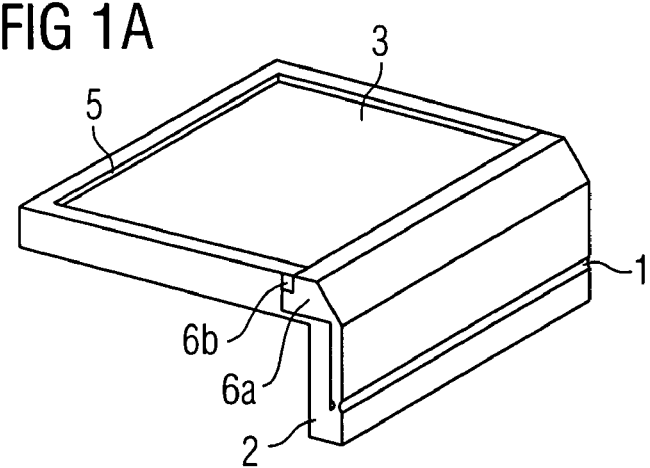
FIG. 1 is a perspective representation of a reflector arrangement according to the invention in the closed and open states.
Figure 1B:
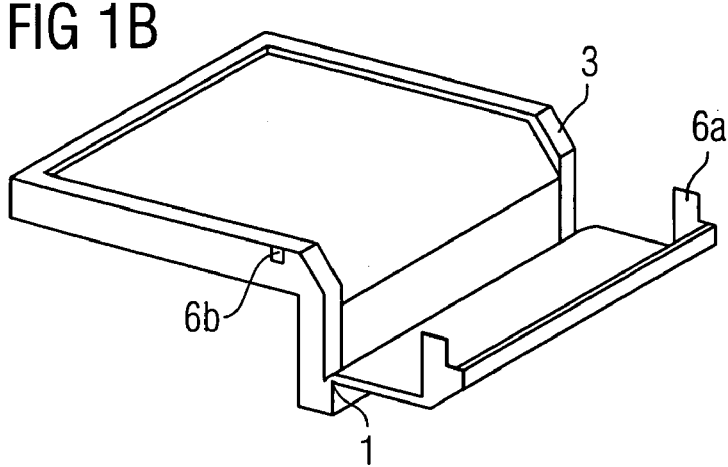
Figure 2:
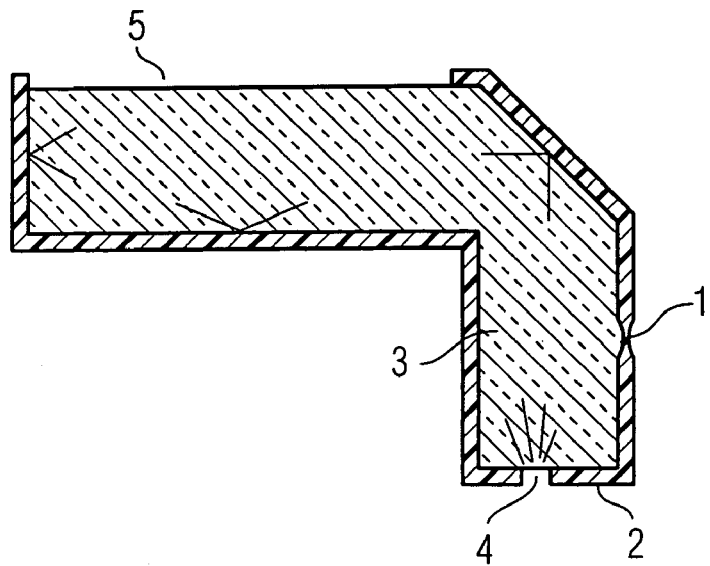
FIG. 2 is a schematic cross section through the embodiment according to FIG. 1.

FIG. 1, in conjunction with FIG. 2, depicts a first exemplary embodiment of the invention. FIG. 1a shows a reflector arrangement in a first embodiment and mode of perspective representation. The arrangement includes the reflector 2 and the light guide 3, which in this embodiment is implemented as an angled light guide. Angled light guides are particularly suitable as deflecting light guides. Deflecting light guides are light guides in which the main direction of incoming radiation and the main direction of outgoing radiation are different. FIG. 1a shows the arrangement in the usable, assembled state. Hence, in this perspective only the portion of the light guide 3 from which the light is extracted can be seen through the light exit window 5.

The fastener assigned to the film hinge 1 is implemented in this embodiment as a snap lug 6b comprising a snap bracket 6a.

FIG. 1b shows this same embodiment of the reflector arrangement in the pre-assembled state. The light guide 3 is inserted in the opened reflector 2. A side wall of the reflector 2 is provided with a film hinge 1 with the aid of which the reflector 2 can be opened or closed.

The implementation of the light guide 3 as an angled light guide can be clearly recognized in this representation. This embodiment permits simple assembly by inserting the light guide 3 into the reflector 2 from above and folding the reflector 2 shut with the aid of the film hinge 1, the foldable side wall being snapped into place by means of fastening elements 6a and 6b. Other fastening elements are feasible besides this specific embodiment of the fastening elements comprising a snap lug 6b and a snap bracket 6a.

FIG. 2 is a cross section through the embodiment of FIG. 1, clarifying the operation of this embodiment. Light is coupled through a light entrance window 4 into the light guide 3, and guided through light guide 3 to exit window 5. The reflector 2 serves to reflect stray light back into the light guide 3 and thereby reduce losses. The light is able to exit the arrangement through light exit window 5. Arrows in the cross-sectional representation serve to illustrate exemplary beam paths. The reflector 2 embraces the light guide 3, but leaves the regions of light exit window 5 and light entrance window 4 bare. A function of securing the light guide 3 can also be performed by the reflector 2. In this specific embodiment, a securing effect can be realized merely by having reflector 2 tightly surround light guide 3.

Figure 3:
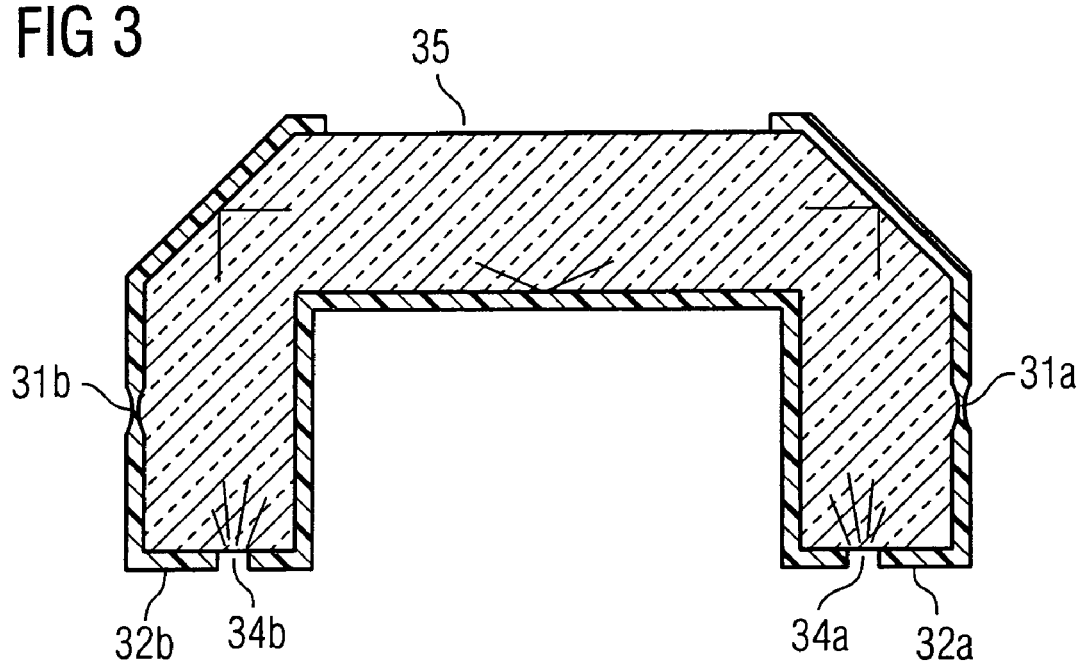
FIG. 3 is a schematic cross section of a further exemplary embodiment of the invention.

FIG. 3 shows another embodiment of the reflector arrangement, comprising two light entrance windows 34a, 34b and two film hinges 31a, 31b.

With an embodiment of this kind, the light can be coupled into the reflector arrangement from plural light sources, thereby increasing the usable light intensity at the exit window 35. The light guide is configured as U-shaped and is secured by the reflector. Arrows in the cross-sectional representation serve to illustrate exemplary beam paths.

Figure 4:
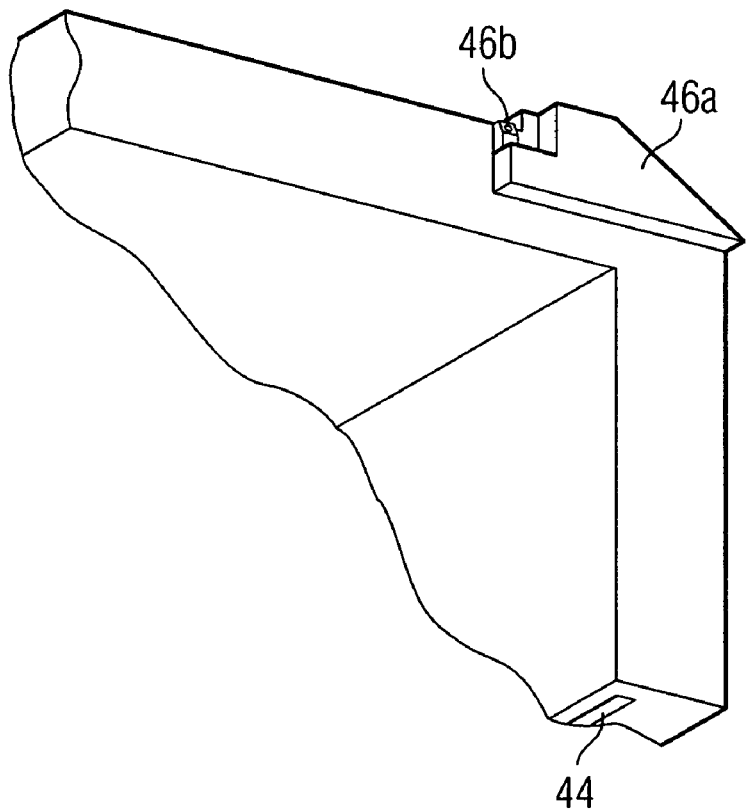
FIG. 4 is the perspective representation of a specific embodiment comprising a fastening means.

FIG. 4 is a perspective representation of some details of the embodiment according to FIG. 1. Illustrated is the snap connection, in which snap bracket 46a is snapped into place over snap lug 46b. The light guide is arranged behind light entrance window 44. The fasteners can be implemented as a snap connection, a latch, or glued or hot-swaged elements. Hot swaging is an irreversible fastening method that involves local incipient melting of the elements to be fastened.

Figure 5:
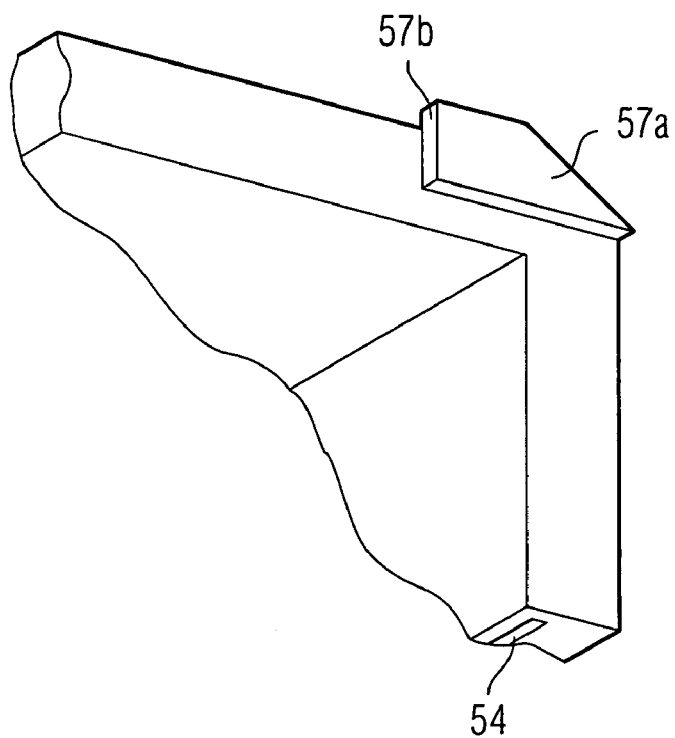
FIG. 5 is the perspective representation of a specific embodiment comprising contact surfaces.

FIG. 5 is a perspective representation of another fastening arrangement for the reflector elements in an embodiment of the light guide according to FIG. 1: fastening by means of contact surfaces is illustrated. Such contact surfaces 57a and 57b can be secured to each other by various methods. Possible methods are adhesive bonding using a glue, welding and hot swaging the two contact surfaces in the contact region. The light guide is arranged behind light entrance window 54.

Figure 6:
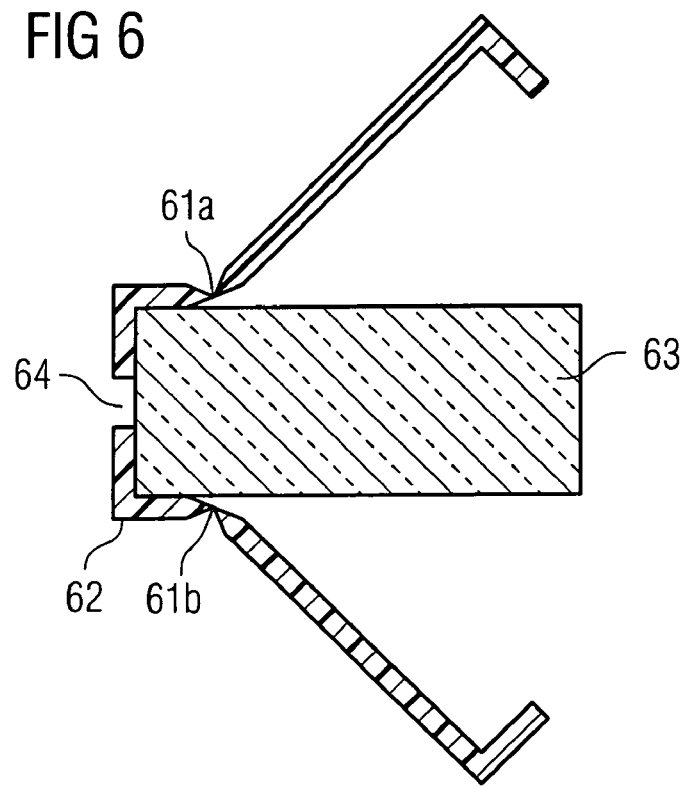
FIG. 6 is a cross-sectional representation of a further embodiment of the reflector arrangement, comprising rod-shaped light guides.

FIG. 6 shows another exemplary embodiment of the reflector arrangement, in which the light guide 63 is implemented as a rod-shaped light guide. The representation of FIG. 5 shows the arrangement in the open, pre-assembled state.

This embodiment furnishes a simple way of completely surrounding a light guide except for a light entrance window 64 and a light exit window. The light guide 63 is pushed into the reflector 62 from the side opened by means of film hinges 61a, 61b. The side walls are snapped toward each other and secured by means of lateral fasteners (not shown).

FIG. 7, in FIGS. 7a to 7f, depicts various inventive embodiments of film hinges. The illustrations are schematic. They consist of cross-sectional representations, in FIGS. 7a to 7c, and side views, in FIGS. 7d to 7f, of various embodiments. Film hinges according to the invention can also comprise combinations of the features depicted in FIGS. 7a to 7f.

Figure 7A:
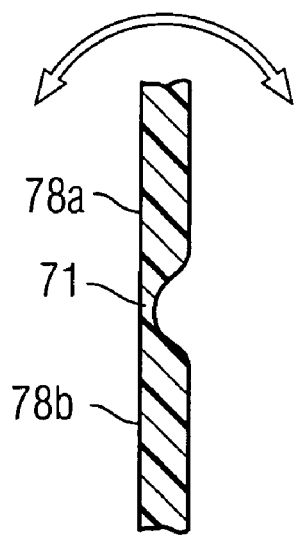
FIG. 7 depicts various embodiments of film hinges according to the invention and FIG. 8 is a schematic cross section through an embodiment comprising fastening means between the light guide and the reflector.
Figure 7B:
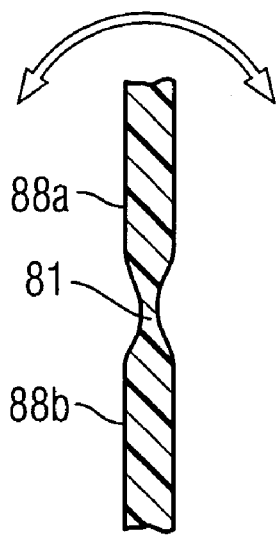
Figure 7C:
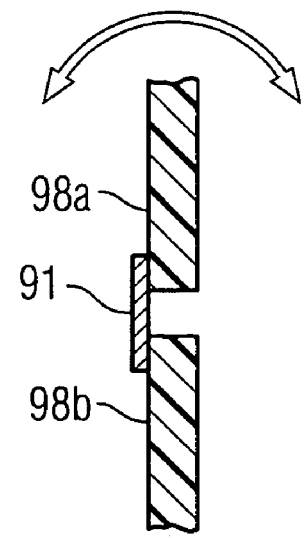
Figure 7D:
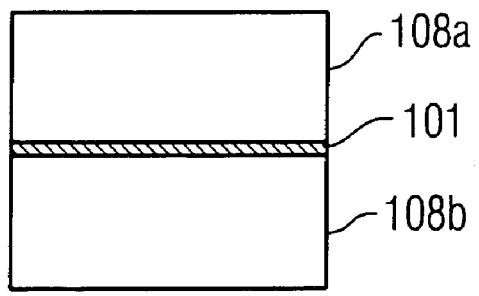
Figure 7E:
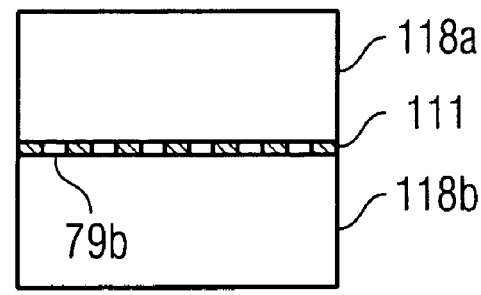
Figure 7F:
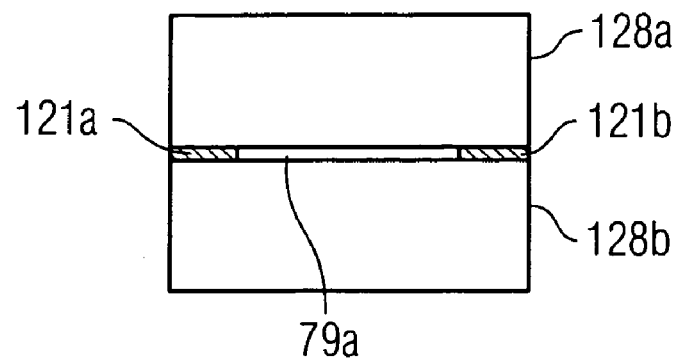

FIGS. 7a and 7b represent film hinges 71, 81 that are implemented in one piece with the shaped bodies 78a, 78b, 88a, 88b. FIG. 7a shows an embodiment in which the film hinge 71 is formed by an asymmetrical taper of each shaped body 78a, 78b at its contact location. FIG. 7b shows an embodiment in which the film hinge 81 is formed by a symmetrical taper. FIG. 7c shows an embodiment according to the invention in which the film hinge 91 is an additional element that connects the two shaped bodies 98a, 98b and is for example glued to them. FIG. 7d is a rear view of an embodiment in which a continuous film hinge 101 along the fold axis connects the two shaped bodies 108a, 108b. FIG. 7e shows a further embodiment that differs from the embodiment of FIG. 7d in that here the film hinge 111 is only segmentally continuous. It comprises gaps 79b along the axis, and can therefore also be characterized as locally interrupted. Such gaps 79b can also be employed as windows. FIG. 7f shows another exemplary embodiment, in which the two shaped bodies 128a, 128b are connected by two film hinges 121a, 121b. In this exemplary embodiment as well, the two film hinges have a common axis.

Figure 8:
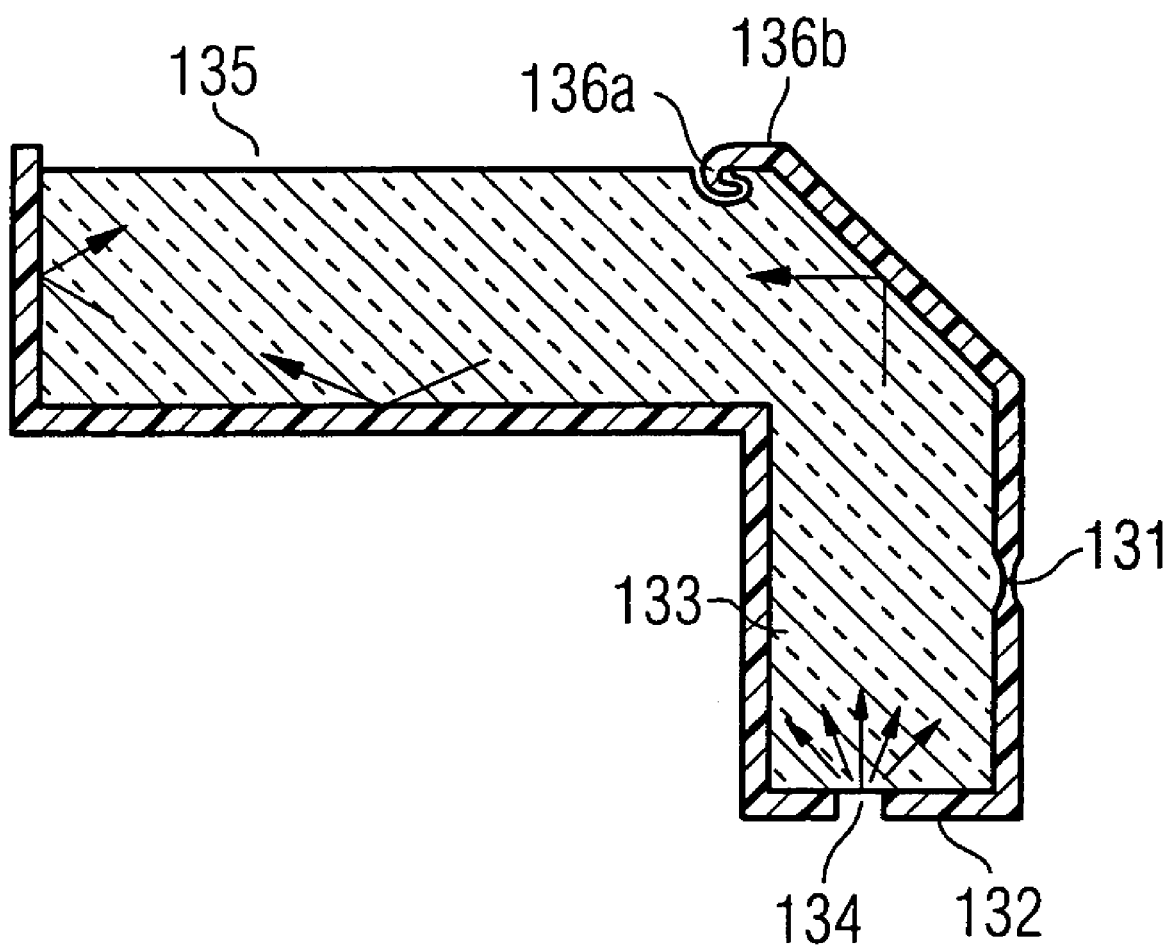

FIG. 8 shows a further advantageous embodiment of a reflector arrangement according to the invention. The light guide 133 is here implemented as an angled light guide such that light which is coupled into the light guide 133 through light entrance window 134 is deflected by the light guide 133 in combination with the reflector 132 and leaves the reflector arrangement from the light exit window 135. This specific embodiment of the invention includes a fastener that fastens the reflector 132 to the light guide 133. To with, a shaped body of reflector 132 that comprises a snap bracket 136a is snapped onto a snap lug 136b, said snap lug 136b being part of the light guide 133. Arrows in the cross-sectional representation serve to illustrate exemplary beam paths.

The invention claimed is:

1. A reflector arrangement comprising a light guide and, assigned to said light guide, a reflector, wherein said reflector comprises plural shaped reflective bodies connected by means of at least one film hinge, and wherein at least one of the plural shaped reflective bodies is secured by means of a fastener.

2. The reflector arrangement as in claim 1, wherein said reflector and said film hinge are implemented in one piece.

3. The reflector arrangement as in claim 1, wherein at least two reflective shaped bodies of said reflector can be secured to one another by means of assigned fasteners.

4. The reflector arrangement as in claim 1, wherein said reflector is implemented as an injection molded part.

5. The reflector arrangement as in claim 1, wherein said at least one film hinge comprises a material having one or more openings.

6. The reflector arrangement as in claim 1, comprising a plurality of film hinges which have a common axis.

7. The reflector arrangement as in claim 1, wherein said light guide is angled.

8. The reflector arrangement as in claim 1, wherein the assembled said reflector at least partially surrounds said light guide.

9. The reflector arrangement as in claim 1, further comprising at least one fastener configured to secure at least one shaped reflective body of said reflector to at least one member selected from the group consisting of: another shaped reflective body and said light guide.

10. The reflector arrangement as in claim 1, wherein said fastener is selected from the group consisting of: a snap mechanism, a quick-lock coupling mechanism, and contact surfaces, the contact surfaces selected from the group consisting of: adhesive bonds, welded joints, and hot-swaged joints.

11. The reflector arrangement as in claim 1, wherein said reflector secures said light guide.

12. The reflector arrangement as in claim 1, comprising at least one member selected from the group consisting of: one or more light exit windows, and one or more light entrance windows.

13. The reflector arrangement as in claim 8, wherein the reflector substantially entirely surrounds said light guide except for regions of said light guide that include at least one member of the group consisting of: one or more light entrance window regions through which light enters said light guide, and one or more light exit window regions through which light exits said light guide.

14. The reflector arrangement as in claim 2, wherein said reflector substantially entirely surrounds said light guide except for regions of said light guide that include at least one member of the group consisting of: one or more light entrance window regions through which light enters said light guide, and one or more light exit window regions through which light exits said light guide.

15. The reflector arrangement of claim 1, wherein the at least one film hinge comprises a region of a shaped reflective body having a reduced thickness relative to other regions of the shaped reflective body.

16. The reflector arrangement of claim 1, wherein the at least one film hinge comprises a member connected to each of two shaped reflective bodies, and wherein the at least one film hinge has a thickness that is less than a minimum thickness of portions of the two shaped reflective bodies to which the at least one film hinge is connected.

17. The reflector arrangement of claim 12, wherein the at least one member comprises an aperture formed in a portion of a shaped reflective body.

18. The reflector arrangement of claim 1, wherein the fastener is formed by a portion of at least one shaped reflective body.

19. The reflector arrangement of claim 1, wherein the fastener comprises a latch formed by a portion of a shaped reflective body, and a corresponding depression in the light guide that is shaped to receive the latch.

* * * * *